United States Patent [19]

Agarwal

[11] Patent Number: 4,568,417
[45] Date of Patent: Feb. 4, 1986

[54] CONTROL SYSTEM FOR PRILLING TOWERS

[75] Inventor: Suresh C. Agarwal, Parma, Ohio

[73] Assignee: The Babcock & Wilcox Company, New Orleans, La.

[21] Appl. No.: 569,647

[22] Filed: Jan. 10, 1984

Related U.S. Application Data

[63] Continuation-in-part of Ser. No. 419,111, Sep. 16, 1982, abandoned.

[51] Int. Cl.[4] .................. B01D 1/14; B01D 1/18; B01D 3/42
[52] U.S. Cl. .................. 159/4.04; 159/44; 159/47.2; 159/48.1; 34/34; 34/54; 364/500; 564/73
[58] Field of Search .............. 159/48.1, 29, 44, 4 R, 159/4 CC, 47.2; 203/1, 49, 90, 2; 364/500, 501, 502; 202/236, 234; 34/46, 43, 54, DIG. 4, 22, 32, 34, 30, 26, 47, 50; 564/73, 63

[56] References Cited

U.S. PATENT DOCUMENTS

| | | | |
|---|---|---|---|
| 2,671,968 | 3/1954 | Criner | 34/46 |
| 2,842,193 | 7/1958 | Ballestra | 159/4 CC |
| 3,128,159 | 4/1964 | De Francisci | 159/44 |
| 3,130,225 | 4/1964 | Friend | 159/4 CC |
| 3,186,102 | 6/1965 | Brociner et al. | 159/44 |
| 3,188,783 | 6/1965 | Savage | 159/44 X |
| 3,525,162 | 8/1970 | Brewer et al. | 159/48.1 X |
| 4,003,137 | 1/1977 | Björn et al. | 34/46 X |
| 4,386,471 | 6/1983 | Bowrey et al. | 34/46 X |
| 4,424,072 | 1/1984 | Lerner | 564/63 X |

Primary Examiner—Wilbur Bascomb
Attorney, Agent, or Firm—Vytas R. Matas; Robert J. Edwards

[57] ABSTRACT

An apparatus and method for controlling the moisture content of prilled products which are produced by air drying a spray of the liquid product, comprises a vessel for receiving a flow of air and a flow of the liquid product, a supply line for supplying air to the vessel (14) and a supply line for supplying liquid product to the vessel (16). The product is advantageously a solution of urea. Moisture content is measured or inferred for the product flow, the input air, and the air coming out of the vessel. An air flow controller (24) is connected for controlling the flow of air (14) into the vessel (10) which controller is itself controlled by a circuit that calculates the required air input flow rate for a desired moisture concent in the prilled product.

7 Claims, 1 Drawing Figure

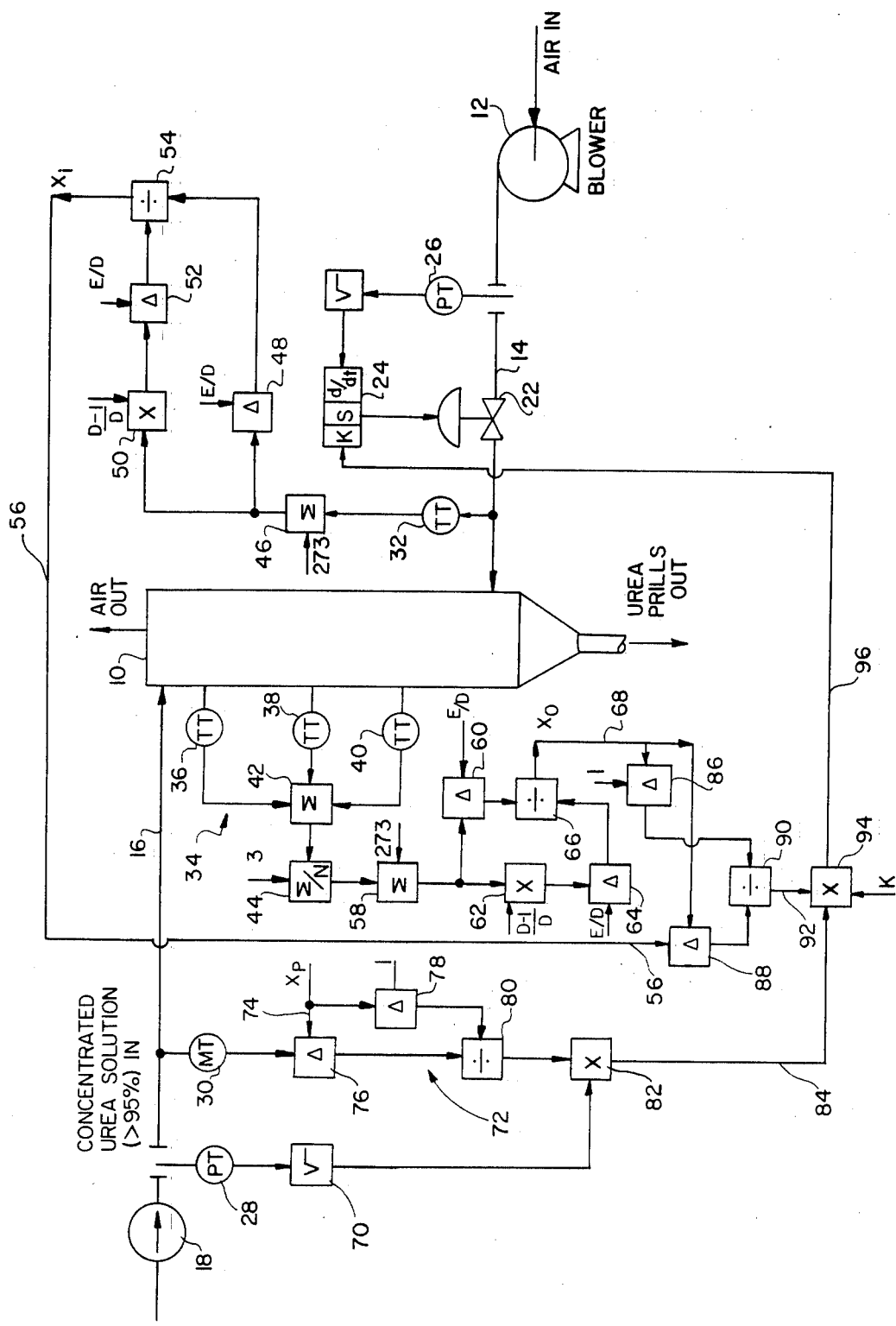

CONTROL SYSTEM FOR PRILLING TOWERS

FIELD AND BACKGROUND OF THE INVENTION

This application is a continuation-in-part of Ser. No. 06/419,111, filed Sept. 16, 1982, now abandoned.

The present invention relates in general to the manufacturing of prilled fertilizer products, and in particular to a new and useful technique and device for controlling the moisture content of urea prills.

Fertilizer manufacturing processes are known which utilize concentrated solutions, for example, a concentrated urea solution from an evaporator to feed a prilling tower. The solution is typically at a concentration of 95% or greater and supplied to the prilling tower by spraying the solution at the top of the tower through multiple jets or distributors. Atmospheric air flow is supplied in countercurrent fashion to the spray whereby the concentrated solution is dried into the final prilled product.

U.S. Pat. No. 4,219,589 to Niks et al discloses a process for urea granulation wherein the urea granules are prepared by spraying an aqueous urea solution into a fertilizer bed of urea nuclei. In this manner the aqueous urea solution coats the nuclei and crystalizes thereon to form granules having a desired size. This reference is directed entirely to the formation of such granules having a specific size and does not disclose any means for controlling the inlet air temperature and humidity so as to maintain a proper moisture content for the resulting urea granules or prills. U.S. Pat. No. 3,287,408 to Veltman is directed to a process for rendering urea prills free flowing and non-caking. This process entails agitating a bed of urea prills and a specific contact zone and maintaining the bed at a specific temperature in order to dry the prills.

Other U.S. patents which are relevant in understanding the invention are No. 2,653,391 to Edmunds, Jr. and 3,261,105 to Mullen, Jr.

A problem which remains in such prilled urea manufacturing processes is, however, that a close control of moisture content in the prilled urea is not maintained. Moisture content for prilled urea is of key significance for the use of the product as fertilizer. This is because a moisture content greater than a desired product specification will result in the formation of lumps of urea prills. Consequently, efficiency in a packing operation is reduced due to clogging and the effectiveness of the fertilizer is reduced, due to a reduction in surface area which is available for chemical reaction.

A moisture content less than a desired product specification may result in cracks formed on the prill surface which increases surface area for water absorption during packaging, shipping, etc. This ultimately reduces the effectiveness of the fertilizer.

If either the moisture content is too great or too low in the finished product, the only available actions are the constant maintenance of packing operation equipment to prevent clogging, the formation of a solution of the prilled product and the re-prilling thereof, or the disposal of the off-specification product by either selling it at a lower rate or simply discarding it.

SUMMARY OF THE INVENTION

The present invention provides a method and apparatus which closely controls the moisture content of prilled products, in particular urea prills, by controlling the flow rate of air into the prilling tower or vessel.

According to the invention, measurement of temperature and humidity values are taken at various locations in the process and are used to calculate a desired air input flow rate for a specified and desired moisture content in the prilled product.

Accordingly, an object of the present invention is to provide an apparatus for controlling the moisture content in a prilled product produced by air drying a spray of the product solution which comprises a vessel for receiving a flow of air and a flow of the product solution, air supply means for supplying air at an air flow rate to the vessel and product solution supply means for supplying the product solution at a feed flow rate to the vessel. First, second and third moisture content means provide signals corresponding respectively to the product flow moisture content, the input air moisture content and the output air moisture content. An air flow controller is connected to the air supply means for controlling the flow of air and a control circuit is connected to the controller for adjusting the air input flow rate as a function of the various moisture contents and the product flow rate.

Another object of the invention is to provide an apparatus for calculating the moisture content of the input and output air as a function of the input air temperature and average temperature within the prilling tower.

A further object of the invention is to provide a method of controlling the moisture content of a prilled product which is produced by air drying a spray of the product which comprises determining the moisture content of the product flow to a prilling tower, the moisture content of input air to the tower, the moisture content of output air from the tower, and the product flow rate, selecting a desired moisture content for the prilled product and controlling the air flow rate to the prilling tower according to an algorithim which is a function of the moisture contents for the product flow, the input and output air, and the product flow rate.

A still further object of the invention is to provide an apparatus for controlling moisture content in prilled products, in particular urea prills, which is simple in design, rugged in construction, and economical to manufacture.

The various features of novelty which characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

BRIEF DESCRIPTION OF THE DRAWING

The only FIGURE in the disclosure is a schematic representation of a control prilling tower, an apparatus for achieving the invention.

DESCRIPTION OF THE PREFERRED EMBODIMENT

Referring to the drawing in particular, the invention embodied therein comprises an apparatus for controlling moisture content of prilled products, in particular urea prills, by drying a spray of product using a flow of atmospheric air. A prilling tower or vessel 10 is supplied with atmospheric air by blower 12 over a line 14. Line 14 is connected to the bottom of tower 10. To the top of tower 10 a product line 16 is connected which, using a schematically shown product supply pump 18, supplies liquid product, in this case an aqueous solution of urea, to the top of tower 10. The spray of liquid product is exposed to a countercurrent flow of drying air and dried into pellets or prills which exit the bottom tower 10 at prilled product output 20.

Connected to air line 14 is an air flow valve 22 which is controlled by controller 24 to regulate the amount of drying air supplied to tower 10. The flow of air is sensed by flow transmitter 26. The flow of urea solution, which is preferably at 95% or higher in concentration and supplied from an evaporator (not shown), is sensed by flow transmitter 28. The moisture content of the product flow is determined in a hygrometer unit 30.

The temperature of input air on line 14 is provided by temperature sensor or thermocouple 32. The average temperature within vessel 10 is supplied by temperature averaging means 34. Temperature averaging means 34 include, for example, three temperature transmitters 36, 38, and 40, that take temperatures at various levels of the vessel 10. These temperatures are combined in unit 42 and divided by three in unit 44 to obtain an average value for the temperature within vessel 10. The remaining circuitry is utilized to develop an algorithm according to the invention wherein the desired moisture content of the prilled product is achieved by controlling the flow rate of input air through valve 22 into vessel 10.

The analysis utilized to achieve the present invention takes temperature and humidity quantities into account. The symbols used here, have the following meanings:

F = Feed flow rate of urea solution (product flow);
P = Prilled product output stream flow rate;
$\chi_F$ = Water concentration in urea feed solution;
$\chi_P$ = Desired water concentration in the prilled product;
$A_i$ = Flow rate of inlet air;
$A_o$ = Flow rate of outlet air;
$\chi_i$ = Moisture concentration of inlet air;
$\chi_o$ = Moisture concentration of outlet air;
$P_w$ = Vapor pressure of water (atm);
T = Average tower temperature (°K.);
$T_i$ = Inlet air temperature (°K.); and
A, B, C, D, and E are emperically determined constants.

For overall material balance; it is assumed that:

$$F + A_i = P + A_o \quad (1)$$

and, for water balance, that:

$$F\chi_F + A_i\chi_i = A_o\chi_o + P\chi_P \quad (2)$$

For urea balance it is assumed that:

$$F(1-\chi_F) = P(1-\chi_P) \quad (3)$$

For equations (1), (2), and (3), the following can be obtained by solving for $A_o$ in equation (1), solving for P in equation (3), substituting the resulting expressions for $A_o$ and P in equation (2), and solving for $A_i$ which yields:

$$A_i \approx \left[\frac{(\chi_F - \chi_P)}{(1-\chi_P)}\right] \cdot \left[\frac{(1-\chi_o)}{(\chi_o - \chi_i)}\right] \cdot F \quad (4)$$

Equation (4) gives the required flow rate of inlet air $A_i$ for a desired water concentration in the prilled product $\chi_P$ as long as all other variables ($\chi_F$, $\chi_o$, $\chi_i$, and F) can be either measured or inferred.

It is difficult to measure the moisture concentration of outlet air $\chi_o$. However, it can safely be assumed that the maximum moisture concentration of outlet air is limited to that of saturated air. Then:

$$\chi_o = P_w/(1-P_w) \quad (5)$$

where $P_w$ = vapor pressure of moisture in air at saturation = partial pressure of moisture in air at saturation where, $P_w$ may be given by the expression:

$$\log_{10} P_w = A - B/(T+C) \quad (6)$$

Equation (6) can be reduced over a limited temperature range into:

$$P_w = D - (E/T) \quad (7)$$

Upon substituting equation (7) into (5) and simplifying yields:

$$\chi_o = \frac{\frac{E}{D} - T}{T\left(\frac{D-1}{D}\right) - \frac{E}{D}} \quad (8)$$

and similarly:

$$\chi_i = \frac{\frac{E}{D} - T_i}{T_i\left(\frac{D-1}{D}\right) - \frac{E}{D}} \quad (9)$$

From equations (4), (8), and (9), it is noted that the required flow rate of inlet air $A_i$ can be determined for a desired water concentration in the prilled product $\chi_P$ using only the measured or inferred values of $\chi_F$, $T_i$, T and F variables.

Functionally, the desired inlet air flow is given by:

$$A_i = KG(\chi_F, \chi_P, T_i, T, F) \quad (10)$$

where:
K = Multiplicative constant accounting consistency of units; and
G = A function depending on variables $\chi_F$, $\chi_P$, $T_i$, T, and F.

An exact expression for equation (10) can be obtained by substituting equations (8) and (9) into (4) as follows:

$$A_i = K \left[ \left[ \frac{(\chi_F - \chi_p)}{(1 - \chi_p)} \right] \cdot \frac{\left( 1 - \frac{\left(\frac{E}{D} - T\right)}{\left(T\left(\frac{D-1}{D}\right) - \frac{E}{D}\right)} \right)}{\left( \frac{\left(\frac{E}{D} - T\right)}{\left(T\left(\frac{D-1}{D}\right) - \frac{E}{D}\right)} \right) - \left( \frac{\left(\frac{E}{D} - T_i\right)}{\left(T_i\left(\frac{D-1}{D}\right) - \frac{E}{D}\right)} \right)} \right] \quad (11)$$

The figure shows the prilling tower control scheme based on the above analysis schematically depicted in Standard notation with the symbols applicable to analog control systems. The implementation shown herein is a conventional electronic instrumentation and control system, nevertheless it can be easily implemented via a control computer system.

The input air temperature $T_i$ from transmitter 32, which is in degrees C., is converted in unit 46 to degrees K. by adding 273 thereto. This brings the temperature $T_i$ to thermodynamic scale. The inlet air moisture concentration $\chi_i$ is provided on line 56 after being calculated according to equation (9) in units 48, 50, 52, and 54. These units all have the functions and manipulate the values as shown in the drawing.

The average tower temperature T is calculated by summing transmitters 36, 38, and 40 in unit 30 and then averaging in unit 44. This value in degrees C. is converted in unit 58 to degrees K. by adding 273 thereto. This brings the temperature T to thermodynamic scale. The moisture concentration of outlet air $\chi_o$ is provided on line 68 after being calculated according to equation (8) in units 60, 62, 64, and 66. These units all have the function and manipulate the values as shown in the drawing.

The first factor of equation (4) is generated by means generally designated 72. The desired water concentration in the prilled product $\chi_p$ is supplied over line 74 to unit 76 which subtracts this value from the water concentration in urea feed solution $\chi_F$ determined by hydrometer 30 to produce the numerator of the first factor in equation (4). The denominator of the first factor in equation (4) is established in unit 78 and division is achieved in unit 80. The first factor of equation (4) is multiplied by product flow, F, determined from function generator 70, in multiplication unit 82 and supplied along line 84 to unit 94.

The numerator of the second factor in equation (4) is established in unit 86. The denominator of the second factor in equation (4) is established by unit 88. Division occurs in unit 90 and the value of the second factor in equation (4) is then supplied along line 92 to unit 94.

Multiplication unit 94 multiplies the three factors of equation (4) together as well as multiplying this value by the constant K to produce the required air flow of inlet air value $A_i$. Value $A_i$ is supplied over line 96 to controller 24 which compares it with the measured value for the flow rate of inlet air provided by flow transmitter 26 to control air flow valve 22.

Thus, according to the invention the said process point to be chosen is the desired moisture concentration in the prilled product $\chi_p$ and the control parameter is the flow rate of inlet air $A_i$.

While a specific embodiment of the invention has been shown and described in detail to illustrate the application of the principles of the invention, it will be understood that the invention may be embodied otherwise without departing from such principles.

What is claimed is:

1. An apparatus for controlling moisture content $(\chi_p)$ in a prilled product produced by air drying a spray of the product in a prilling tower having a feed line for supplying the product, air supply means for supplying air to said tower, air output means for removing air from said tower and an exit line for the prilled product, comprising:

means for sensing the product flow rate (F) into said tower;

first moisture content means for sensing the product input moisture content $(\chi_F)$;

second moisture content means for calculating a signal corresponding to an input air moisture content $(\chi_i)$;

third moisture content means for calculating a signal corresponding to an output air moisture content $(\chi_o)$;

a control circuit connected to said first, second and third moisture content means and to said means for sensing the product flow rate, said circuit being operable to establish an input air flow rate $(A_i)$ needed for a selected prilled product moisture content according to the equation:

$$A_i = \frac{(\chi_F - \chi_p)}{(1 - \chi_p)} \times \frac{(1 - \chi_o)}{(\chi_o - \chi_i)} \times F; \text{ and}$$

air control means connected to said control circuit and said air supply means for controlling the air flow rate of said air supply means in response to the established input air flow rate.

2. An apparatus according to claim 1, including a first temperature sensor for sensing a temperature of input air supplied by the air supply means $(T_i)$, said second moisture content means comprising a circuit for calculating said input air moisture content as a function of said input air temperature.

3. An apparatus according to claim 1, wherein said third moisture content means comprises prilling tower temperature sensor means for obtaining a value for an average temperature (T) in said tower and a circuit for calculating said output air moisture content as a function of said prilling tower temperature.

4. An apparatus according to claim 1, wherein said first moisture content means is a hydrometer.

5. An apparatus according to claim 3, wherein said prilling tower temperature sensor means comprises a plurality of temperature sensors connected at spaced locations along a height of said tower and an averaging circuit for obtaining the average prilling tower temperature connected to said plurality of temperature sensors.

6. A method of controlling moisture content ($\chi_p$) in a prilled product produced by air drying a spray of the product in a prilling tower having a feed line for supplying the product, air supply means for supplying air to said tower, air output means for removing air from said tower and an exit line for the prilled product, comprising:

sensing the product flow rate (F) into said tower;

obtaining a value corresponding to a moisture content of the product ($\chi_F$) flowing into said tower;

selecting a desired moisture content ($\chi_p$) for the prilled product;

obtaining a value corresponding to the moisture content of input air to said tower ($\chi_i$);

obtaining a value corresponding to a moisture content of air leaving said tower ($\chi_o$);

calculating a required input air flow rate ($A_i$) according to the equation:

$$A_i = \frac{(\chi_F - \chi_p)}{(1 - \chi_o)} \times \frac{(1 - \chi_o)}{(\chi_o - \chi_i)} \times F;\text{ and}$$

controlling the flow of input air to said tower to meet the required input air flow rate ($A_i$).

7. A method according to claim 6, including supplying the input air to a lower end of the tower and the product flow to an upper end of the tower, the product flow comprising a concentrated aqueous solution of urea.

* * * * *